United States Patent
Gamberini et al.

[11] Patent Number: 5,341,911
[45] Date of Patent: Aug. 30, 1994

[54] METHOD AND DEVICE FOR FEEDING A SUCCESSION OF REELS TO A PICKUP STATION

[75] Inventors: Antonio Gamberini, Bologna; Marco Brizzi, Zola Predosa; Salvatore Carboni, Bologna, all of Italy

[73] Assignee: G. D. Societa' per Azioni, Bologna, Italy

[21] Appl. No.: 73,597

[22] Filed: Jun. 9, 1993

[30] Foreign Application Priority Data

Jun. 23, 1992 [IT] Italy .................. BO92A 000253

[51] Int. Cl.⁵ ........................................... B65G 47/244
[52] U.S. Cl. ................................. 198/409; 198/407
[58] Field of Search .............. 198/345.1, 400, 406, 198/407, 409, 414; 242/35.5 A

[56] References Cited

U.S. PATENT DOCUMENTS

| 2,700,332 | 1/1955 | Donald | 198/407 X |
| 4,249,847 | 2/1981 | Tokuno | 198/407 X |
| 4,509,891 | 4/1985 | Lipscomb | 198/345.1 X |
| 4,874,078 | 10/1989 | Meyer | 198/409 |
| 5,025,911 | 6/1991 | Raasch et al. | 198/407 X |
| 5,147,026 | 9/1992 | Scaglia | 198/409 |

FOREIGN PATENT DOCUMENTS

| 0028113 | 3/1981 | Japan | 198/406 |
| 0249816 | 10/1987 | Japan | 198/409 |
| 0655625 | 4/1979 | U.S.S.R. | 198/409 |
| 1033939 | 6/1966 | United Kingdom . | |
| 1175619 | 12/1969 | United Kingdom . | |

Primary Examiner—James R. Bidwell
Attorney, Agent, or Firm—Sandler Greenblum & Bernstein

[57] ABSTRACT

A method and device for feeding a succession of reels of strip material to a pickup station; the reels being fed successively, and laid flat, on to a low-friction supporting surface, being centered on the supporting surface in relation to an axis substantially perpendicular to the supporting surface, and being lifted off the supporting surface and rolled over into an on-edge pickup position in the pickup station.

10 Claims, 3 Drawing Sheets

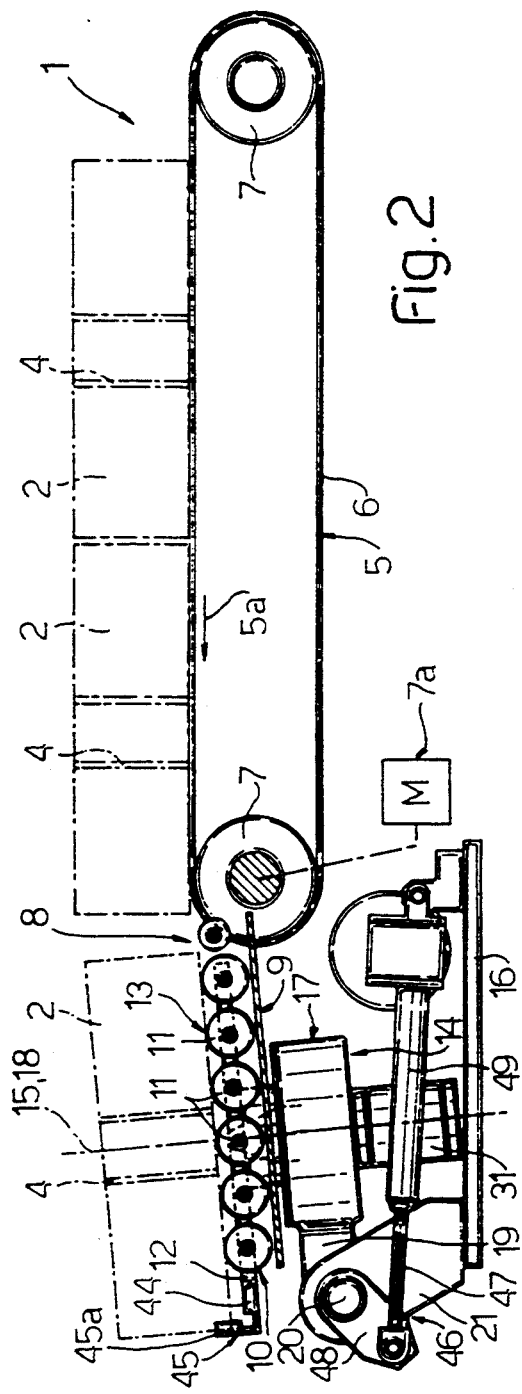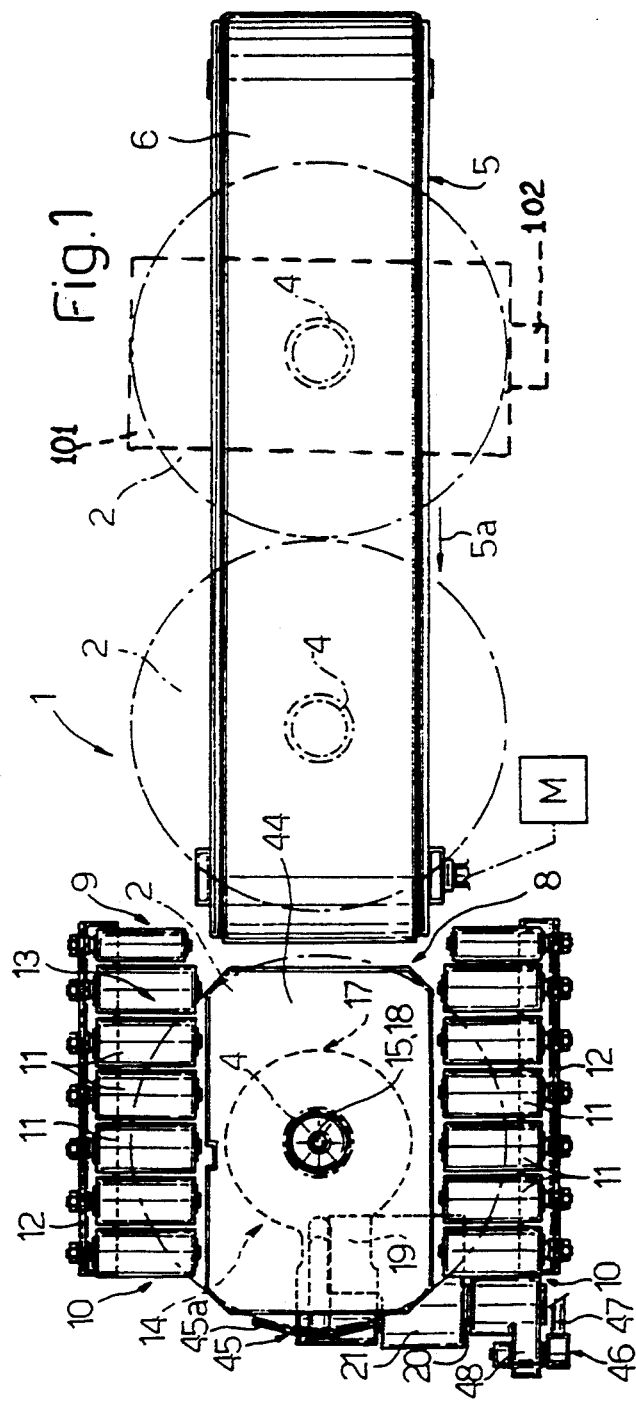

METHOD AND DEVICE FOR FEEDING A SUCCESSION OF REELS TO A PICKUP STATION

BACKGROUND OF TEE INVENTION

The present invention relates to a method of feeding a succession of reels to a pickup station.

Machines employing reels of strip material generally comprise a storage and feed device defining a feed channel for a succession of reels arranged on edge, and which is step-operated so as to successively feed the reels to a pickup station where they are picked up successively by a pickup head and loaded onto an unwinding spindle, normally with a horizontal axis.

The above method of feeding reels successively to a user machine presents several drawbacks, mainly due to the reels being fed forward at all times on edge, and being deformed in contact with external supports, normally required for both supporting and maintaining the reels substantially aligned with one another. As a result of such deformation, which differs from one reel to another, the reels, on reaching the pickup station, are no longer coaxial with the fixed operating axis of the pickup head.

SUMMARY OF THE INVENTION

It is an object of the present invention to provide a straightforward, relatively low-cost method of feeding a succession of reels to a pickup station, designed to overcome the aforementioned drawbacks.

According to the present invention, there is provided a method of feeding a succession of reels of strip material to a pickup station, comprising steps of feeding the reels successively, and laid flat, on to a low-friction supporting surface adjacent to said pickup station; centering the reels on the supporting surface into a supporting position coaxial with an axis substantially perpendicular to the supporting surface; and rolling the reels over into an on-edge pickup position in said pickup station.

The present invention also relates to a device for feeding a succession of reels to a pickup station.

According to the present invention, there is provided a device for feeding a succession of reels to a pickup station, the device including a substantially horizontal, lowfriction supporting surface adjacent to the pickup station and on which the reels are laid flat; a conveyor for successively feeding the reels, laid flat, on to said supporting surface and in a given travelling direction; first centering means for centering the reels into a supporting position coaxial with an axis substantially perpendicular to the supporting surface; and roll-over means for rolling the reels over into an on-edge pickup position in said pickup station.

BRIEF DESCRIPTION OF TEE DRAWINGS

A non-limiting embodiment of the present invention will be described by way of example with reference to the accompanying drawings, in which:

FIG. 1 shows a plan view of a preferred embodiment of the device according to the present invention;

FIG. 2 shows a partially sectioned side view, with parts removed for clarity, of the FIG. 1 device;

DETAILED DESCRIPTION OF TEE INVENTION

Figure 3:
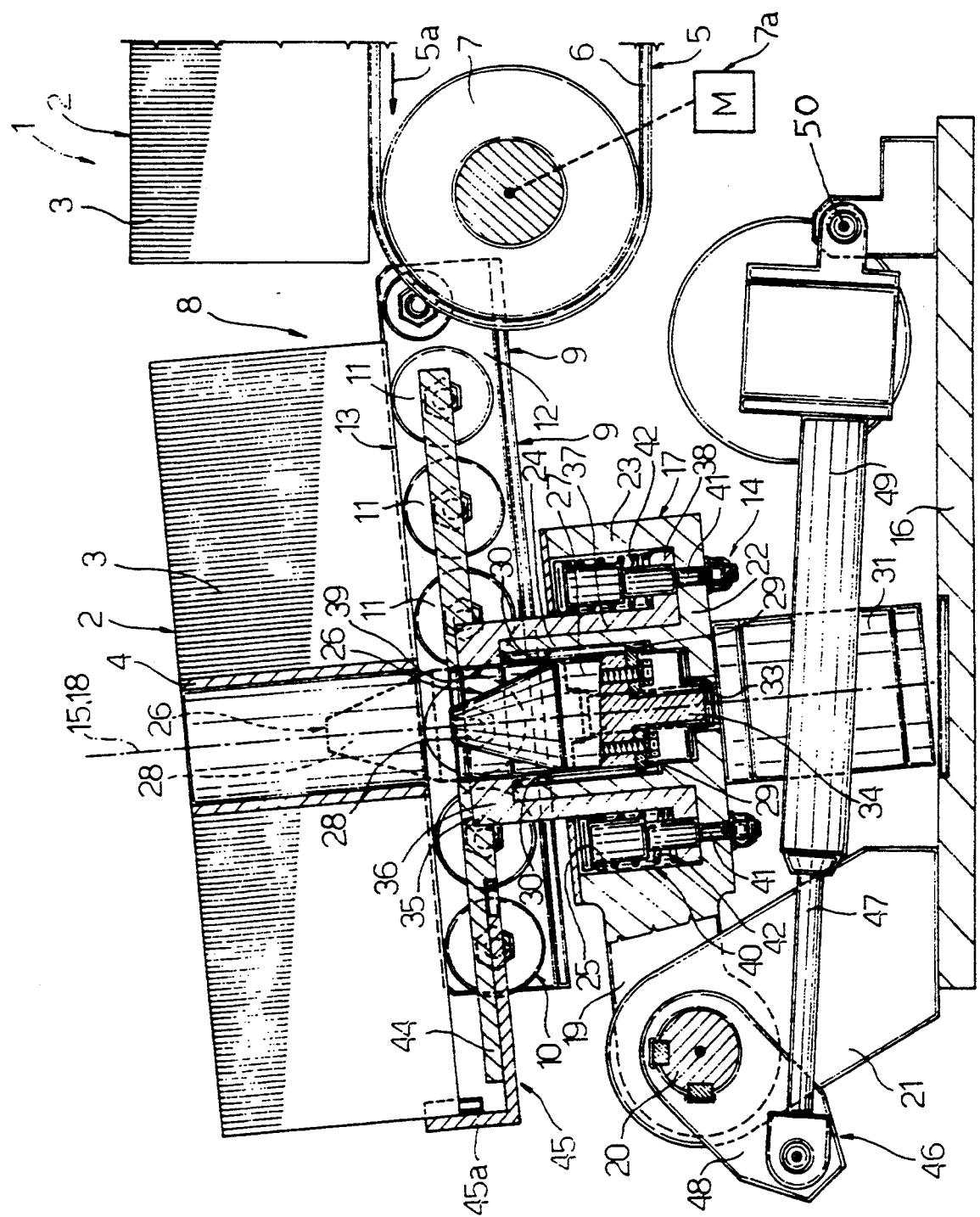
FIG. 3 shows a larger-scale section of a detail in FIG. 2.

Number 1 in the accompanying drawings indicates a device for feeding a succession of reels 2 of sheet material to a pickup station A (FIG. 4) defining, for example, the input of a cigarette packing or wrapping machine not shown.

In particular, device 1 provides for feeding a succession of reels 2, each consisting of a strip 3 of wrapping material wound about a substantially cylindrical, tubular central core 4.

Device 1 comprises a substantially horizontal conveyor belt 5 in turn comprising a belt 6 looped about two guide rollers 7 mounted for rotation on a respective frame (not shown) and one of which is connected to an electric step motor 7a. Belt 6 provides for feeding reels 2, laid flat and in direction 5a, to a reel roll-over station 8, and on to a roller conveyor 9 also forming part of device 1, arranged substantially horizontally in station 8, but sloping slightly downwards towards station A.

Roller conveyor 9 constitutes an extension of conveyor 5 in direction 5a, and comprises two rows 10 of rollers 11 arranged side by side and parallel to one another and to rollers 7. Rows 10 are located on either side of the output portion of conveyor 5, and each comprises a number of rollers 11 mounted for rotation on respective pins projecting from a frame 12, and extending towards rollers 11 in the other row 10 so as to define a low-friction supporting surface 13 for reels 2.

Device 1 also comprises a reel centering and roll-over unit 14 located in station 8, at conveyor 9, and which provides for centering reels 2, fed successively off conveyor 5, into a supporting position (FIG. 3) on conveyor 9 and in relation to a fixed reference axis 15 substantially perpendicular to supporting surface 13; and for successively rolling reels 2 over in station A into a pickup position (dotted line in FIG. 4) wherein they are positioned on edge ready for pickup by a known handling device (not shown) and transferred into the operating position (not shown) on the packing machine (not shown).

Unit 14 comprises a supporting frame 16, and a centering and roll-over head 17 having a longitudinal axis 18 and connected integrally with the end portion of an arm 19. The opposite end of arm 19 is fitted to a hinge pin 20, the axis of which is perpendicular to both direction 5a and axis 18, and which is fitted in a rotary and axially-fixed manner to a bracket 21 extending upwards from frame 16.

Figure 4:
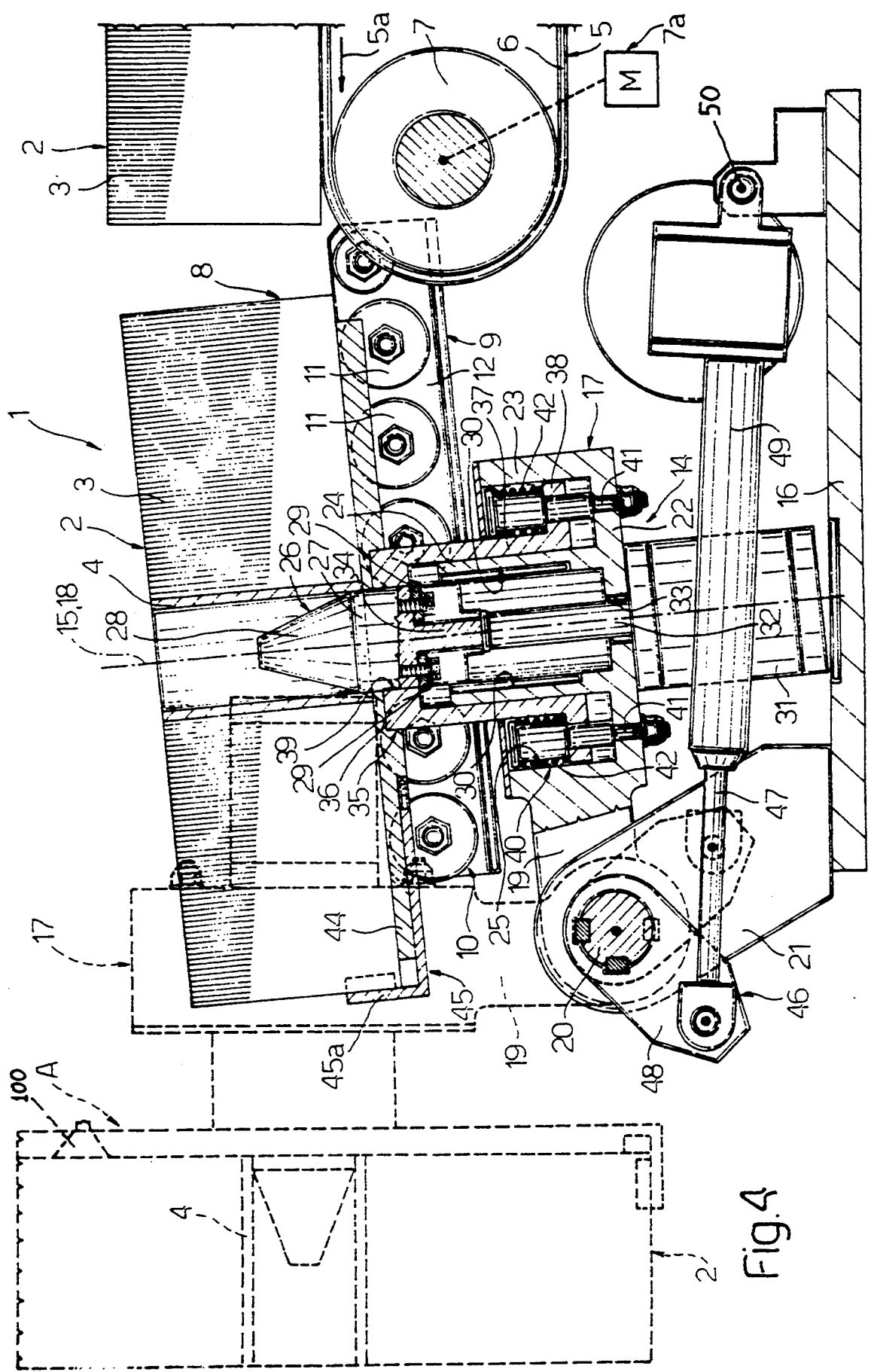
FIG. 4 shows the same view as in FIG. 3, of the device in a different operating position.

As shown in FIG. 4, head 17 is substantially cup-shaped, and is so sized transversely as to loosely engage the gap between rows 10 of rollers 11. Head 17 comprises a bottom wall 22; a cylindrical lateral wall 23 extending from wall 22 and coaxial with axis 18; and a cylindrical sleeve 24 housed inside cylindrical wall 23, integral with the inner surface of bottom wall 22, extending coaxially with axis 18, and projecting outwards of cylindrical wall 23. Sleeve 24 presents an outside diameter smaller than the inside diameter of cylindrical wall 23 with which it defines an annular chamber 25.

Head 17 also comprises a centering spindle 26 for gradually engaging core 4 of reel 2 on roller conveyor 9, and for centering reel 2 in relation to fixed axis 15. Spindle 26 extends coaxially with axis 18, and comprises a cylindrical portion 27 having a diameter approximately equal to but no larger than the inside diameter of cores 4, and which engages sleeve 24 in an axially-sliding manner; and a truncated-cone-shaped end portion 28 tapering towards its free end and integral with portion 27. Spindle 26 is secured angularly in relation to sleeve 24 by means of a pair of keys 29 fitted integrally to and projecting radially outwards of portion 27, and each of which engages, in a sliding manner, a respective axial groove 30 formed on the inner surface of sleeve 24.

Spindle 26 is moved along axis 18 by a linear actuator 31 integral with the outer surface of bottom wall 22 of head 17, and the output rod 32 of which loosely engages a hole 33 in wall 22, and is integrally connected with one end of a rod 34, the other end of which is integral with spindle 26. Actuator 31 provides for moving spindle 26 between a forward operating position (FIG. 4) wherein portions 27 and 28 of spindle 26 are located outwards of sleeve 24 and engage core 4, and wherein keys 29 are released from respective grooves 30; and a withdrawn idle position (FIG. 3) wherein spindle 26 is located substantially inside sleeve 24.

Each movement of spindle 26 between said operating and idle positions corresponds to a similar movement of a cup-shaped piston 35 forming part of head 17 and comprising a bottom wall 36 facing bottom wall 22 of head 17. Piston 35 also comprises a cylindrical wall 37 fitted in an axially-sliding manner on to sleeve 24 and terminating with an annular outer flange 38 engaging chamber 25 in an axially-sliding manner. More specifically, as it moves from the withdrawn idle position to the forward operating position, spindle 26 engages in an sliding manner a hole 39 formed in wall 36, and draws piston 35 along with itself by means of keys 29, which, as spindle 26 nears the forward operating position, are released from respective grooves 30 and contact the inner surface of wall 36 so as to secure spindle 26 and piston 35 axially and unidirectionally in relation to each other.

As shown in FIGS. 3 and 4, piston 35 is secured to bottom wall 22 by means of an elastic device 40 designed to exert on piston 35 a force in a opposition to that transmitted by keys 29. Device 40 comprises a number of pins 41 (only two shown in FIG. s 3 and 4), each integral at a first end with wall 22, extending inside chamber 25, and engaging in sliding manner a respective hole formed through flange 38. For each pin 41, device 40 also comprises a spring 42 compressed between flange 38 and a flared head on a second end of pin 41 opposite said first end.

As shown in FIG. 4, wall 36 of piston 35 is integrally fitted with a rectangular plate 44 extending parallel to supporting surface 13, of such a size as to loosely engage the gap between rows 10 of rollers 11, and supporting, at the output end of roller conveyor 9 in direction 5a, an adjustable L-shaped bracket 45 for pre-centering reels 2 on roller conveyor 9. More specifically, bracket 45 presents a curved arm 45a defining a limit stop perpendicular to plate 44 and direction 5a, and designed to mate with the outer surface of reel 2. Plate 44 (FIG. 4) preferably presents, close to a radially peripheral edge, at least one through opening 100, the portion of which facing wall 22 communicates (in a manner not shown) with a suction source (not shown), for retaining reel 2 on plate 44 in use and in the course of given operating stages of device 1.

Again with reference to FIG. s 3 and 4, head 17 is rotated in relation to frame 16 and about the axis of pin 20 by a device 46 comprising a connecting rod 47 and a crank 48. Crank 48 is fitted at one end to the end portion of pin 20 projecting from bracket 21, and is hinged at the other end to one end of connecting rod 47. Connecting rod 47 is defined by the output rod of a linear actuator 49, the outer casing of which is fitted to frame 16 beneath the input of roller conveyor 9 and by means of a hinge 50. Actuator 49 provides for rotating head 17 between a first operating position (shown by the continuous line in FIGS. 3 and 4) wherein head 17 is positioned beneath supporting surface 13, with its axis 18 coincident with fixed axis 15, so as to center reel 2 in relation to axis 15; and a second operating position (shown by the dotted line in FIG. 4) wherein axis 18 is substantially horizontal, and head 17, located in pickup station A, supports reel 2 on edge.

Operation of device 1 will now be described as of the condition in which head 17 is set to said first position; plate 44 is set to the lowered idle position beneath surface 13, but with arm 45a projecting above surface 13; and spindle 26 is set to the withdrawn idle position.

In the above condition, motor 7a is operated, and reels 2 are fed successively on to roller conveyor 9. Due to the slight downward slope of conveyor 9, each reel 2 slides along conveyor 9 until it is arrested on arm 45a of bracket 45, which, as stated, acts as a limit stop for pre-centering reels 2 in relation to fixed axis 15. For this purpose, bracket 45 is so positioned that the distance between arm 45a and axis 15 is approximately equal to but no less than the maximum radius of reels 2.

At this point, actuator 31 is operated, and spindle 26 is moved into the forward operating position. Over a first portion of its travel into the forward operating position, portion 28 of spindle 26 gradually engages core 4 of reel 2 on roller conveyor 9 so as to gradually center reel 2 in relation to fixed axis 15; over a second portion of its travel, cylindrical portion 27 of spindle 26 engages core 4, thus securing reel 2 in a position coaxial with axis 15; and, over the final portion of its travel, spindle 26 draws piston 35 along with itself and against the action of springs 42, so as to raise both plate 44 and reel 2 on roller conveyor 9 in relation to the latter. More specifically, spindle 26 moves plate 44, against the action of springs 42, from the lowered idle position beneath surface 13 into a raised operating position over surface 13.

At this point, spindle 26 is maintained inside core 4, and actuator 49 is operated to rotate head 17 in relation to frame 16 and about pin 20 into station A, and respective reel 2 into the unloading position.

Upon reel 2 being unloaded off head 17 in station A, actuators 31 and 49 are again operated successively to restore head 17 and spindle 26 to said first and said withdrawn idle position, respectively.

As they are fed to station A, therefore, reels 2 are not only subjected to no external radial pressure by which they may be deformed, but are also centered accurately in relation to fixed axis 15, with relatively little pressure being applied at all times by virtue of roller conveyor 9. Moreover, by virtue of accurately positioning reels 2 in station A, engagement of core 4 by the movable pickup members (not shown) on the packing machine (not shown) is rendered as smooth as possible.

As shown schematically by the dotted line in FIG. 1, pressure means may also be provided, including a plate 101 connected to actuating means 102 for moving it up and down and perpendicular to the transportation surface of conveyor belt 5, and facing the point at which reels 2 are arrested successively on conveyor belt 5. Pressure means 101 provide for laterally compressing reels 2 prior to use, so as to restore, when necessary, the turns in the strip of which reel 2 is composed to the correct position parallel to the reel axis.

We claim:

1. A method of feeding a succession of reels of strip material to a pickup station, said method comprising the steps of:
   feeding the reels successively, and laid flat, onto a low-friction supporting surface adjacent to said pickup station;
   centering the reels on the supporting surface into a supporting position coaxial with an axis substantially perpendicular to the supporting surface;
   raising the reels off said supporting surface in a direction substantially parallel to said axis; and
   rolling the raised reels over into an on-edge pickup position in said pickup station.

2. A method as claimed in claim 1, further comprising precentering the reels on the supporting surface prior to being centered in relation to said axis.

3. A device for feeding a succession of reels to a pickup station, the device comprising:
   a substantially horizontal, low-friction supporting surface adjacent to the pickup station, the reels being laid flat on said supporting surface;
   a conveyor for successively feeding the laid flat reels on to said supporting surface and in a predetermined travelling direction;
   first centering means for centering the reels into a supporting position coaxial with a reference axis, said reference axis being perpendicular to the supporting surface;
   lifting means for lifting the reels off said supporting surface in a direction substantially parallel to said reference axis; and
   roll-over means for rolling the reels over into an on-edge pickup position in said pickup station.

4. A device for feeding a succession of reels to a pickup station, the device comprising:
   a substantially horizontal, low-friction supporting surface adjacent to the pickup station, the reels being laid flat on said supporting surface;
   a conveyor for successively feeding the reels laid flat onto said supporting surface and in a predetermined travelling direction;
   first centering means for centering the reels into a supporting position coaxial with a reference axis, said reference axis being substantially perpendicular to the supporting surface;
   a second centering means for pre-centering the reels on said supporting surface, said second centering means including a limit stop device on said supporting surface, downstream from said reference axis in said predetermined travelling direction, and at a distance from said reference axis approximately equal to but no less than the radius of said reels; and
   roll-over means for rolling the reels over into an on-edge pickup position in said pickup station.

5. A device for deeding a succession of reels to a pickup station, the device comprising:
   a substantially horizontal, low-friction supporting surface adjacent to the pickup station the reels being laid flat on said supporting surface;
   a conveyor for successively feeding the reels laid flat onto said supporting surface and in a predetermined travelling direction;
   first centering means for centering the reels into a supporting position coaxial with a reference axis, said reference axis being substantially perpendicular to the supporting surface; and
   roll-over means for rolling the reels over into an on-edge pickup position in said pickup station, said roll-over means including a head having a longitudinal axis and connected to the frame so as to rotate in relation to said frame about a transverse axis perpendicular to said longitudinal axis and said reference axis; activating means for rotating the head in relation to the frame about said transverse axis, between a first operating position, wherein said longitudinal axis and said reference axis coincide, and a second operating position, wherein said longitudinal axis is substantially horizontal and the head is set to the pickup position in said pickup station; said first centering means being on said head, and including a centering spindle connected to said head, and including a centering spindle connected to said head in an axially-sliding manner along said longitudinal axis; and actuating means for moving the spindle along the longitudinal axis from a withdrawn idle position to a forward operating position, wherein the spindle engages the core of the reel of the supporting surface.

6. A device as claimed in claim 5, wherein said centering spindle includes a first substantially conical end portion, and a second cylindrical portion integral with the first portion, and having a diameter approximately equal to but no larger than the inside diameter of the core of said reel; said first and second portions respectively engaging the core of the reel on said supporting surface in the course of a first and second portion of the travel of said spindle.

7. A device as claimed in claim 6, wherein said also comprise a plate for supporting said reel, said spindle extending through said plate, wherein said plate is connected in a sliding manner with the spindle, and being movable along said longitudinal axis between a lowered idle position beneath said supporting surface and a raised operating position over the supporting surface, wherein said plate supports said reel; elastic means for retaining said plate in said lowered idle position; and key means on the spindle for rendering the spindle and the plate axially integral with each other during at least part of the second portion of the travel of said spindle.

8. A device as claimed in claim 7, wherein said plate includes at least one through opening.

9. A device as claimed in claim 7, further comprising second centering means for pre-centering the reels on said supporting surface; said second centering means being supported on said plate and projecting across said supporting surface when the plate is in said lowered idle position.

10. A device for feeding a succession of reels to a pickup station, the device comprising:
   a substantially horizontal, low-friction supporting surface adjacent to the pickup station the reels being laid flat on said supporting surface;
   a conveyor for successively feeding the reels laid flat onto said supporting surface and in a predetermined travelling direction;
   first centering means for centering the reels into a supporting position coaxial with a reference axis, said reference axis being substantially perpendicular to the supporting surface;
   pressure means for exerting pressure on said reels in the direction of the reel axis;
   actuating means being provided for moving said pressure means reciprocatingly in said direction of the reel axis; and
   roll-over means for rolling the reels over into an on-edge pickup position in said pickup station.

* * * * *

UNITED STATES PATENT AND TRADEMARK OFFICE
CERTIFICATE OF CORRECTION

PATENT NO. : 5,341,911
DATED : August 30, 1994
INVENTOR(S) : Antonio GAMBERINI et al.

It is certified that error appears in the above-indentified patent and that said Letters Patent is hereby corrected as shown below:

On the title page, item [73], change "G.D. Societa' per Azioni to --G.D Societa' per Azioni--.

Signed and Sealed this

Twenty-seventh Day of December, 1994

Attest:

BRUCE LEHMAN

Attesting Officer      Commissioner of Patents and Trademarks